July 21, 1964   H. C. BRAUCHLA ETAL   3,141,844
METHOD AND APPARATUS FOR DRY SIZING
Filed Sept. 14, 1962   7 Sheets-Sheet 1

INVENTORS
**HERBERT C. BRAUCHLA
PAUL P. RUMINSKY**
BY *Semmes and Semmes*
ATTORNEYS

INVENTORS
**HERBERT C. BRAUCHLA
PAUL P. RUMINSKY**

BY *Semmes and Semmes*

ATTORNEYS

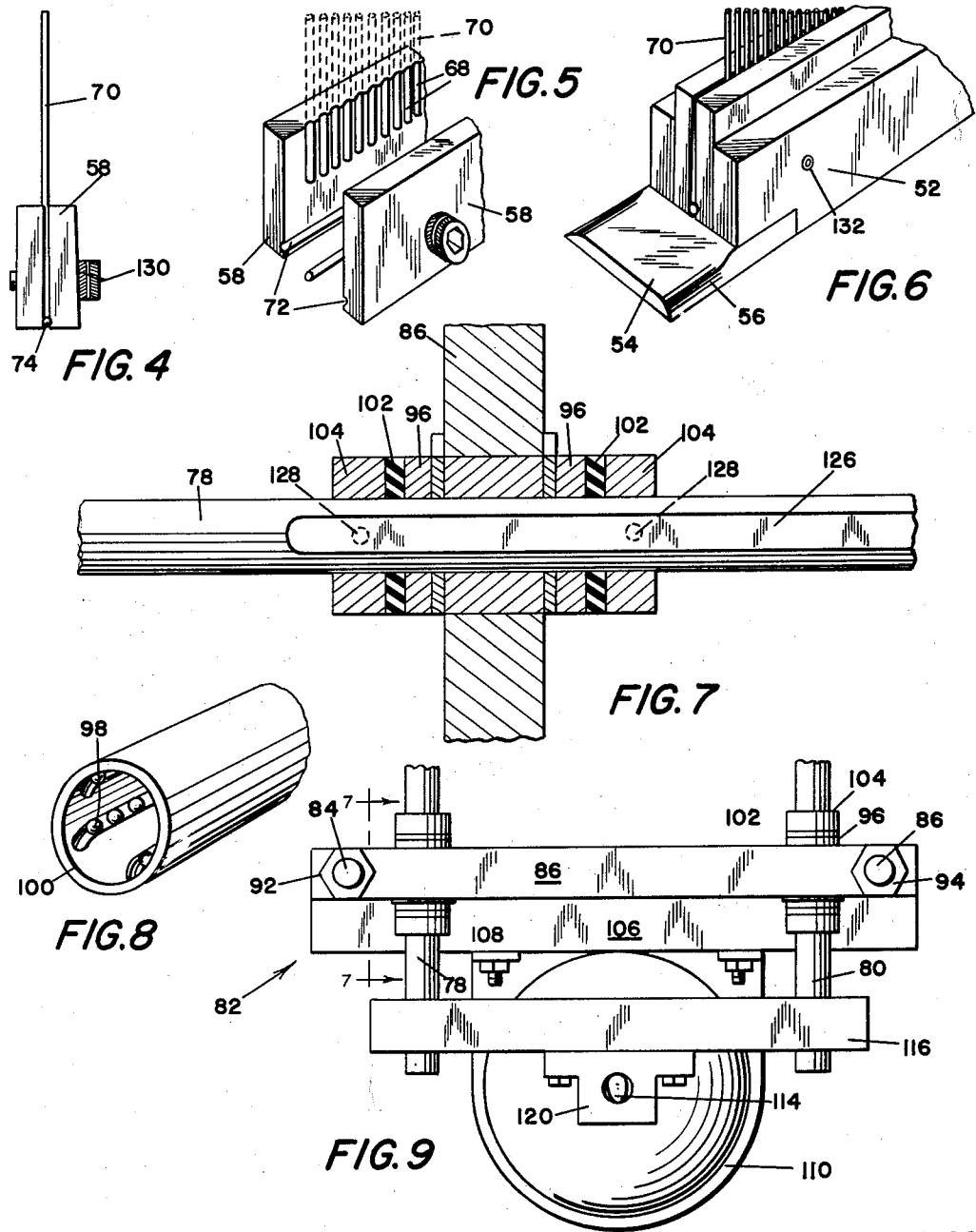

July 21, 1964   H. C. BRAUCHLA ETAL   3,141,844
METHOD AND APPARATUS FOR DRY SIZING
Filed Sept. 14, 1962   7 Sheets-Sheet 5
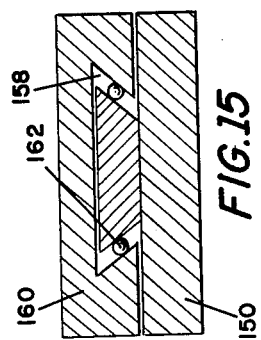
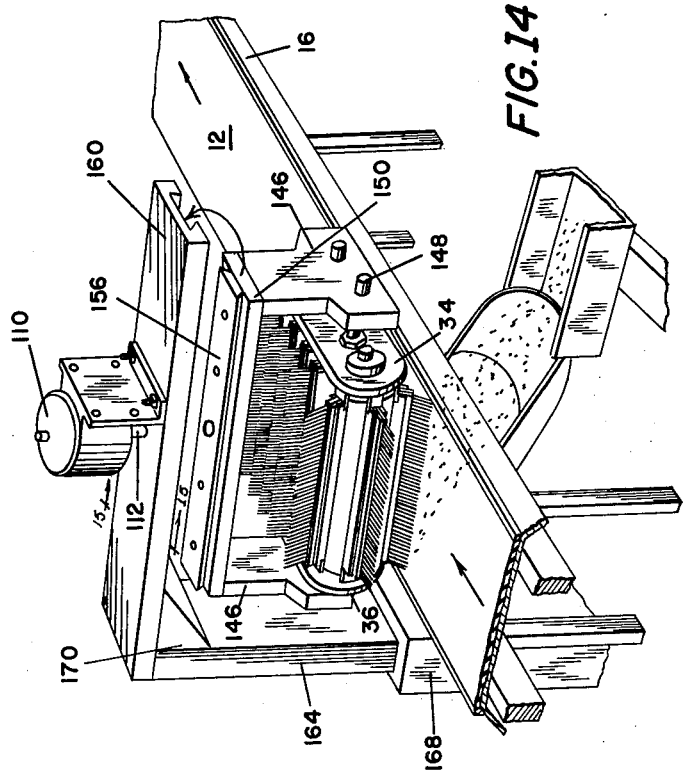
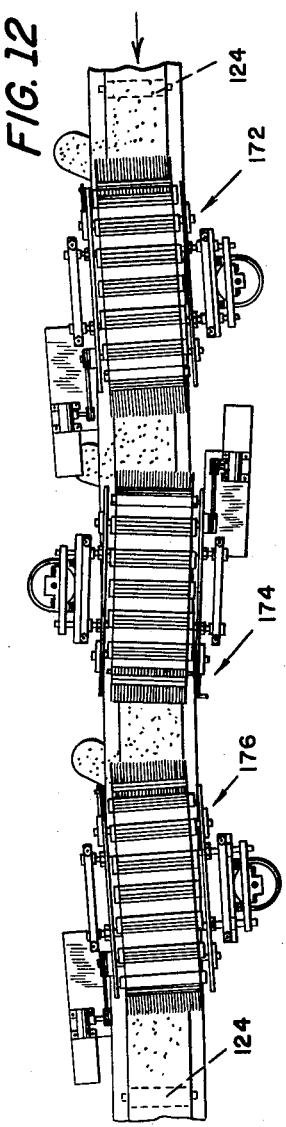
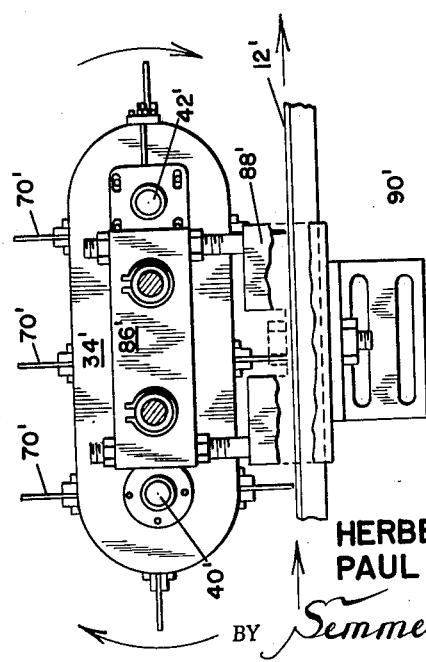
INVENTORS
HERBERT C. BRAUCHLA
PAUL P. RUMINSKY
BY Semmes and Semmes
ATTORNEYS INVENTORS
HERBERT C. BRAUCHLA
PAUL P. RUMINSKY
BY Semmes and Semmes
ATTORNEYS United States Patent Office 3,141,844
Patented July 21, 1964

3,141,844
METHOD AND APPARATUS FOR DRY SIZING
Herbert C. Brauchla, P.O. Box 349, Fremont, Ohio, and Paul P. Ruminsky, Amherst, Ohio; said Ruminsky assignor to said Brauchla
Filed Sept. 14, 1962, Ser. No. 223,626
8 Claims. (Cl. 209—247)

The present application concerns a dry method for sizing of matter, particularly a method for sizing without water great quantities of mineral matter prior to concentration by air.

Previously, there has not been devised any efficient method or apparatus for drying sizing of mineral matter in great volume. Screens used in conventional sizing become clogged and must be cleared by vacuum, beating, shaking or reverse flush. Otherwise centrifugal force is utilized to force the material to be sized through the screen with varying effectivenes. Needless to say, this forcing of the screens and the employment of beaters upon the screen or the like results in continual reduction of the material to be sized beyond the limits of fineness of the sizing screen. This forcing also results in clogging, breakdown and short operating utility of the screens. Also, the necessity for employment of water for forcing or flushing is an extravagant shortcoming and in those sizing methods which do not use water volume is severely restricted. Practically speaking, there is not an efficient method for voluminous sizing of fine materials in the range 5 to 50 mesh nor for sizing of irregularly shaped materials such as slag which continuously clog conventional sizing screens.

According to one of applicant Brauchla's early methods effective sizing is accomplished by advancing matter to be sized upon an endless belt, while rotating a plurality of brushes against the top of said belt, the finely positioned bristles of said brushes pushing greater sized aggregate off the side of the belt while permitting smaller sized matter to be advanced along the belt. According to this early method of applicant Brauchla, a plurality of brushes having increasingly finely spaced bristles are employed to separately remove quantities of different sized matter. According to the present invention more effective sizing is accomplished by repetitive combing of the material to be sized throughout a substantial horizontal portion of its advancing path. This combing is accomplished by the positioning of a plurality of sets of transversely aligned radially extending combs upon an endless belt of oblong cross-section having its top and bottom portions parallel to the conveyor. Thus, the matter to be sized receives more than one contact of a comb, enabling a more precise, as well as more rapid, sizing. Also, means are provided for transversely reciprocating or vibrating the combs so that there is both an enhanced combing action and a continuous clearing of the comb teeth from clogging matter.

Accordingly, it is an object of invention to provide a continuous method for sizing of matter by combing without damaging the matter to be sized.

Another object of invention is to provide an improved method of dry sizing by combing wherein, varying sizes of material are sequentially removed with continuous reduction in volume of the material being attacked.

Yet, another object of invention is to provide a method and apparatus for sizing of advancing matter by repetitive combing throughout a horizontal portion of said advancing.

Additional objects of invention will become apparent from the ensuing specification and attached drawings wherein:

FIG. 4 is an enlarged end elevation of the comb tooth;

FIG. 5 is an exploded perspective of the comb teeth holder pieces;

FIG. 6 is an enlarged, fragmentary perspective of the comb teeth holder pieces assembled in their channel;

FIG. 7 is an enlarged fragmentary cross-section of the linear bearing taken along section line 7—7 of FIG. 9;

FIG. 8 is an enlarged fragmentary perspective of the linear bearing of the type used for reciprocation of the comb assembly;

FIG. 9 is an enlarged top plan of the comb reciprocation assembly;

FIG. 12 is a top plan view of an installation employing a plurality of comb assemblies alternately obliquely disposed with respect to advancing belt 12;

FIG. 13 is a front elevation of a modified construction with fewer sets of combs, only three of which are at any time in parallel with the advancing conveyor belt 12;

FIG. 14 is a fragmentary perspective of a modified installation wherein the entire brush assembly is supported apart from the advancing belt conveyor for independent transverse reciprocation without movement of the conveyor support;

FIG. 15 is a transverse section of joining the FIG. 14 brush assembly to its top support 160;

Figure 1:
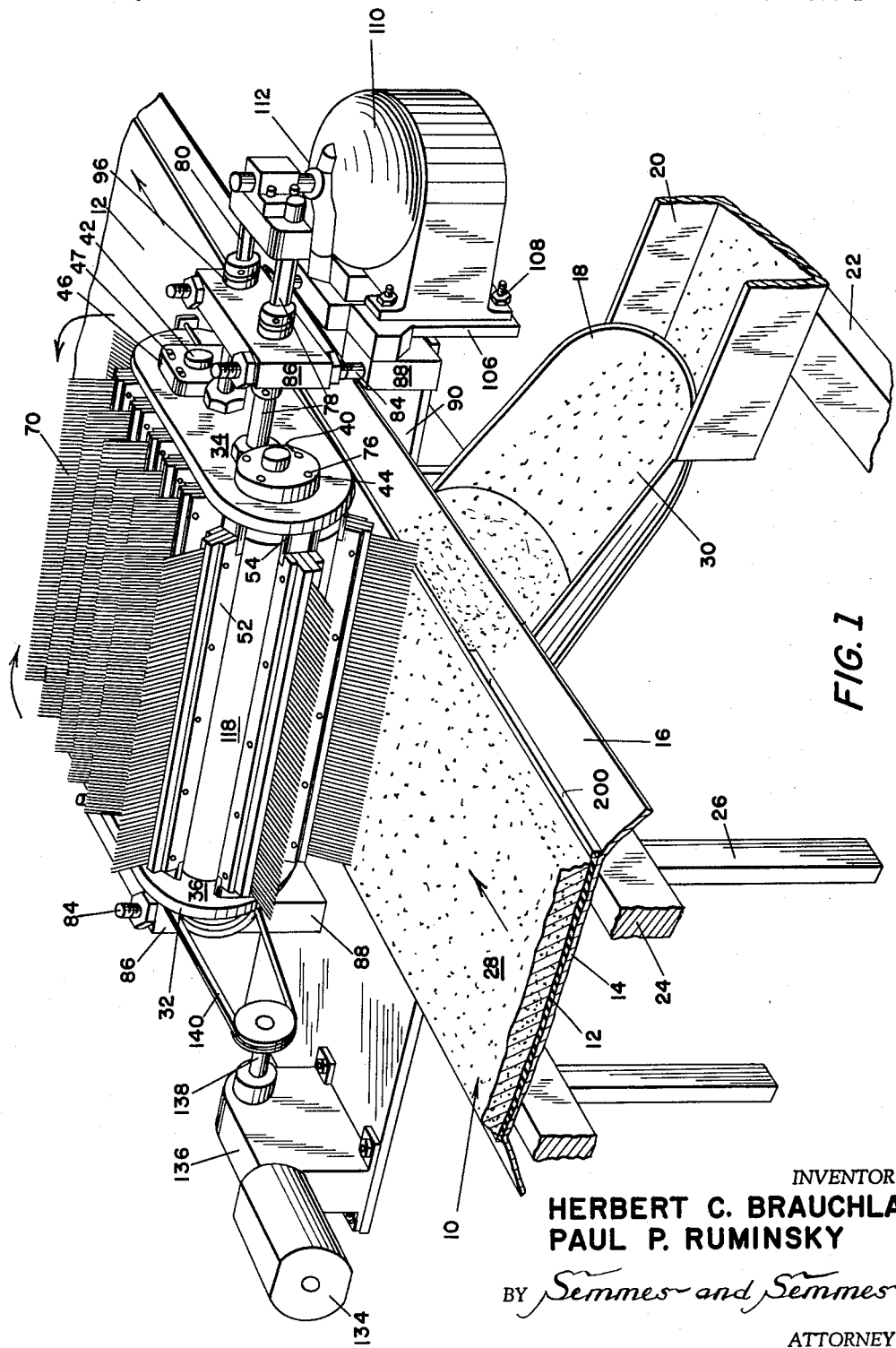
FIG. 1 is a perspective view of a proposed apparatus showing the combing means positioned above an advancing endless belt upon which the matter to be sized is fed.
Figure 2:
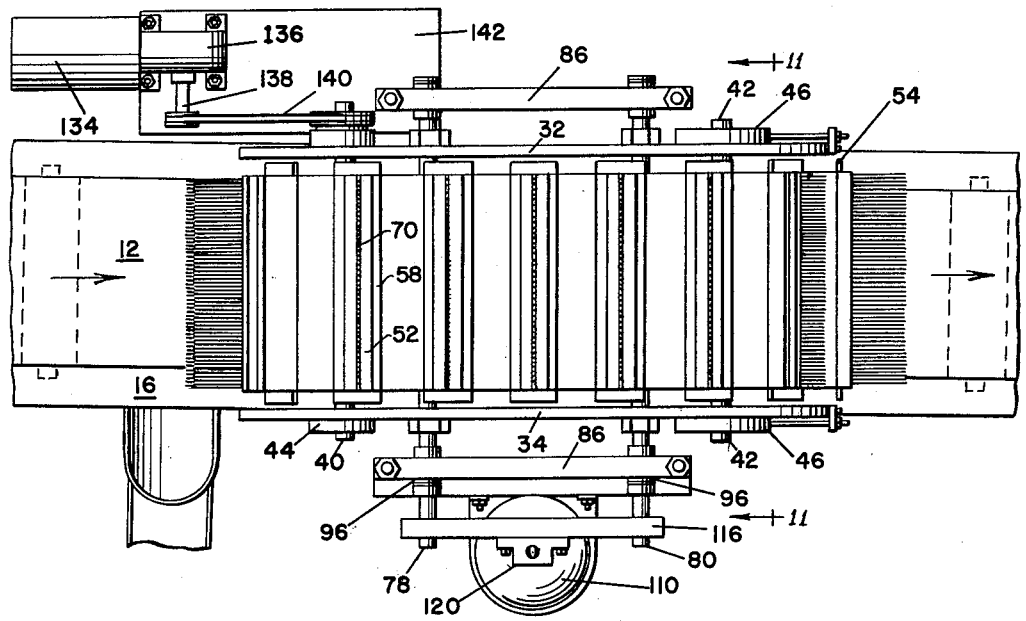
FIG. 2 is a top plan thereof.
Figure 3:
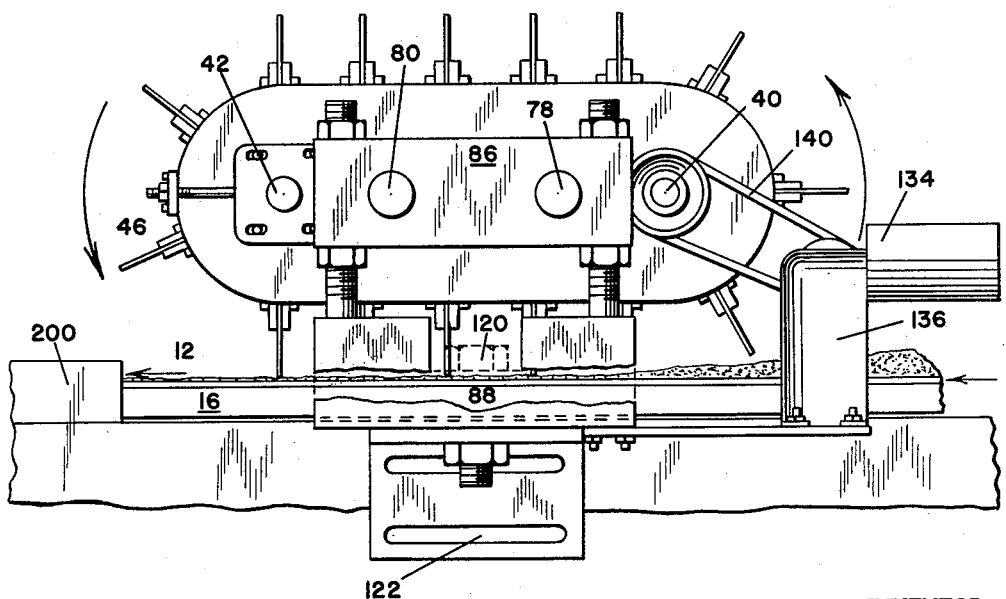
FIG. 3 is a rear elevation thereof with the comb driving means illustrated.

In FIG. 1 a sizing bed generally designated as 10 is shown as comprising an endless conveyor or belt 12 continuously advanced above a stainless steel or like platen 14 having downwardly extending flanges 16 and supported upon a frame consisting of longitudinal members 24 and legs 26. Material to be sized 28 is charged upon conveyor 12 and retained by platen side boards or guards 200, as it is advanced toward the sizing mechanism 32.

Figure 11:
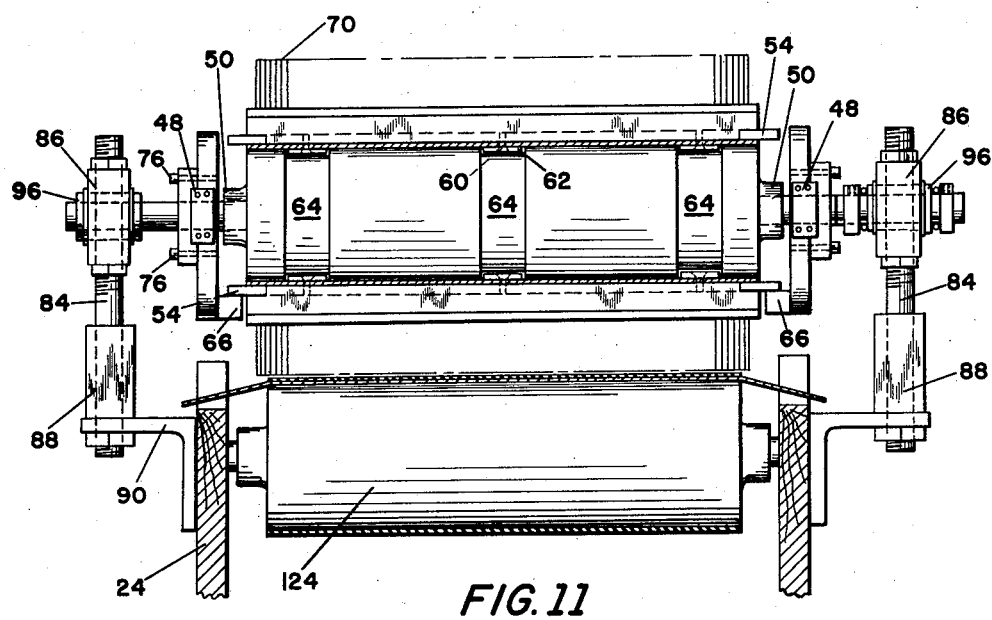
FIG. 11 is a transverse section taken along section line 11—11 of FIG. 2.

The sizing mechanism consists of side plates 34 and 36 and an endless belt 118 mounted upon rollers 38 attached to shafts 40 and 42 which extend through plates 34 and 36. Shafts 40 and 42 are mounted in ball bearings 48 and may be secured in the side plates by means of their respective bearing retainer plates 44 and 46. As illustrated in FIG. 11, retainer plates 44 and 46 may be secured in the side plates by bolts 76, retainer plate 46 having elongated bolt slots so that longitudinal adjusting piece 184 may be employed with bolts 76 for securing shaft 42 in various longitudinal attitudes and thus tighten belt 118. Rollers 38 may be transversely positioned between plates 34 and 36 by hubs 50 encompassing the respective shafts 34 and 36.

Attached to endless belt 118 are transverse channels 52 secured by set screws 60, engaging washers 62 which are positioned within longitudinal grooves 64 in the inner side of belt 118.

As illustrated in FIGS. 4 through 6, the individual combs comprise brush holder pieces 58 having a bottom horizontal groove 72 and vertical milled slots 68 into which the individual teeth 70 may be secured by epoxy or like adhesive. Pairs of holder pieces 58 are secured one to the other by capped bolts 130 which may extend within complementary slots (not illustrated) in channel 52 and be secured in channel 52 by means of bolts 132. As illustrated in FIG. 4 positioning rod 74 may be set in groove 72 to insure that the top portions of pieces 58 are pinched inwardly to secure teeth 70 more firmly. In one modification of invention the individual teeth were embedded one-half inch within pieces 58 and were projected an inch and one-half above pieces 58. Wires in the range $45/_{1000}$ to $60/_{1000}$ inch in diameter have been used, but it is believed that $10/_{1000}$ inch would be more effective. Manifestly, even smaller diameter wires can be employed with rigidity, if the portion projecting beyond holder pieces 58 is shortened.

As indicated in FIGS. 6 and 11 channels 52 have a batten 54 mounted at each end so that beveled edges 56 are presented during rotation for engagement with horizontal guide pieces 66. This arrangement insures that at any given moment a plurality of combs will be normally presented with respect to matter to be sized advancing on conveyor 12.

As indicated in FIGS. 1, 2, 3, and 9, reciprocating register shafts 78 and 80 are mounted for reciprocation in side plates 34 and 36 by means of a "Thompson" type linear motion ball bearing 96 employing ball bearings 98 in groove 100. This construction is particularly illustrated in FIG. 7, the respective shafts 78 and 80 being secured to caps 104 by pins 128 or the like which are set against the shaft flattened portion 126. An intermediate sponge rubber annulus 102 may be positioned between cap 104 and bearing 96. The register shafts extend through side plate 34 into engagement with a mounting bracket assembly generally designated as 82 and consisting of vertical adjusting rods 84 supported in adjustable top guide piece 86 and bottom guide piece 88. The entire mounting bracket assembly is secured on either side to similar brackets 90 which have horizontal slots 122 for oblique positioning of the entire sizing mechanism 32 with respect to conveyor 12. A motor 110 is supported upon motor mounting piece 106 which is in turn secured to batten guide piece 88 by means of bolts 108. As indicated in FIG. 9 motor shaft 112 has an eccentric tip 114 which fits within brass header piece 120 secured to the respective register shafts 78 and 80 by means of yoke 116. As shaft 112 rotates, eccentric tip 114 moving in header piece 120 causes yoke 116 and the register shafts 78 and 80 to be transversely reciprocated. Manifestly, various other than eccentric means may be employed for reciprocating the register rods and thus vibrating the comb assembly. It has been determined that the frequency, rather than the amplitude, of vibration is critical in enhancing the combing action and clearing the individual comb teeth. The shaft 112 has developed 1700 r.p.m. with great vibration effect while conveyor 12 was being advanced at a rate of 31 inches per minute. It is believed that even higher frequencies of vibration can be more effective. However, the frequency of vibration must not be so great as to fracture or mill the material being sized.

As illustrated in FIG. 1, motor 134, embodying transmission 136 drives shaft 138 upon which a pulley is mounted. Belt 140 engages shaft 138 pulley and also a corresponding pulley 202 attached to shaft 40. This entire driving assembly may be supported upon platform 142 attached to frame longitudinal members 24.

As will be apparent, the entire comb assembly is rotated against the advancing conveyor 12. Matter 30 incapable of passing through teeth 70 of the individual combs or between the space between the tips of the comb teeth and belt 12 is diverted by the obliquely positioned combs to a sized material recovery scoop 18 which in turn may lead to a falling air or like concentrator via chute 20 supported upon brace 22. Finer sized material which has passed through the individual teeth 70 is advanced along the belt whence it may engage successive brush assemblies, designated as 172, 174, and 176, in FIG. 12.

It has been found that the transverse reciprocation or vibration of the comb assembly not only cleans the comb but actually enhances the effectiveness of the comb in advancing through the material to be sized. Several advantages of the employment of combs for sizing over the conventional screen assemblies may be simply categorized as follows:

(1) The combs do not clog; therefore, each set of comb teeth is 100% efficient in attacking the material to be sized.

(2) The comb sas well as the individual comb teeth are individually and thus inexpensively replaceable.

(3) The combs provide for continuous removal of bulk from the conveyor instead of batch handling the entire great weight of matter being sized.

(4) Since the comb teeth may be made finer and rigid over a short distance, there is a saving in wire over the conventional screen construction.

(5) Since the combs do not have to be flushed water is eliminated and the combs have increased durability over conventional screens.

(6) Combs are easier to clean and since the material to be sized is not forced there is minimal clogging.

Figure 10:
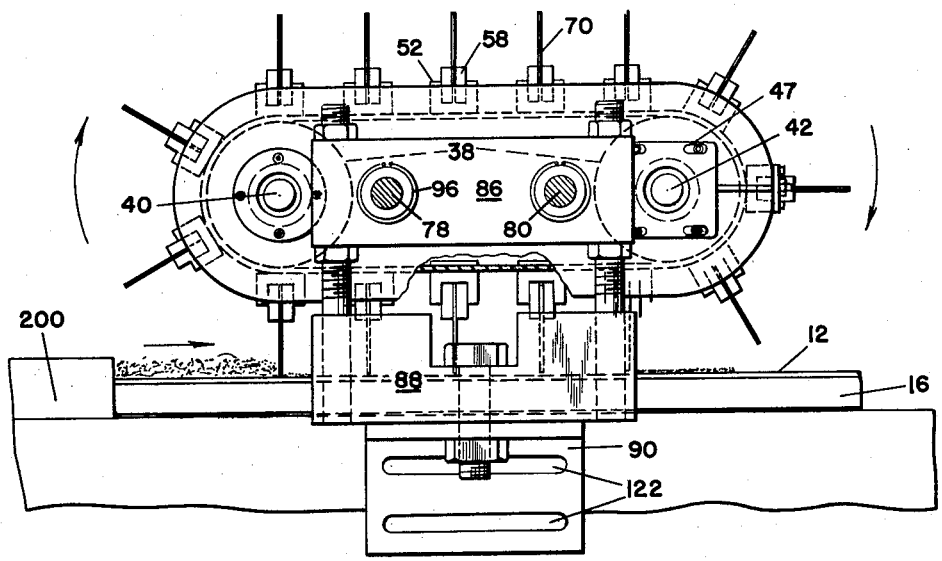
FIG. 10 is a front elevation of the brush assembly being rotated oppositely to the advancing matter to be sized upon belt 12.

The comb teeth 70 themselves may be constructed from a heavy nickel chrome alloy such as that trademarked "Inconel" and manufactured by the International Nickel Company. Also, in addition to the vibrating action of the combs a means might be provided for vibrating the belt to insure leveling of the material to be sized as it approaches the brush apparatus, however it is found that the combs themselves effectively level matter to be sized, regardless of the manner in which it has been charged upon conveyor 12. It is found that the distance between the tips of teeth 70 and the top of the conveyor should be less than the distance between the individual teeth so as to eliminate squeezing of large size particles through the comb assembly. Teeth 70 do not have to be longitudinally aligned. Also, it is found that teeth 70 do not have to be vibrated through their entire cycle. The teeth may be vibrated essentially only during the combing and teeth cleaning portion of their cycle, that is only a 50 degree portion of their cycle or from 6 until 9 o'clock as illustrated in FIG. 10. Manifestly, a "Syntron vibratory feeder" such as that manufactured by The Syntron Corporation (Model HF-3 and AF-3) may be utilized in lieu of an endless belt conveyor 12. Such a feeder while feeding matter weighing 100 pounds per cubic foot has a 15 ton per hour capacity.

In the modification illustrated in FIG. 13 the endless belt is provided with fewer sets of teeth 70' only three of the individual comb units at any one time being presented parallelly to advancing belt 12'. This is a simplification of construction believed to be particularly useful wherein the sizing of matter of 5 mesh or greater sizes is desired.

In FIG. 14 a modified comb assembly 144 is shown positioned between end guide pieces 146 by means of shafts 148, the individual end pieces 146 being secured to a top piece 150 having stud 156 which is mitered to engage a corresponding groove 158 in the head piece 160 supported upon stanchion 164 by means of strut 170. The entire assembly may be supported apart from the conveyor 12 upon base 168.

Figure 16:
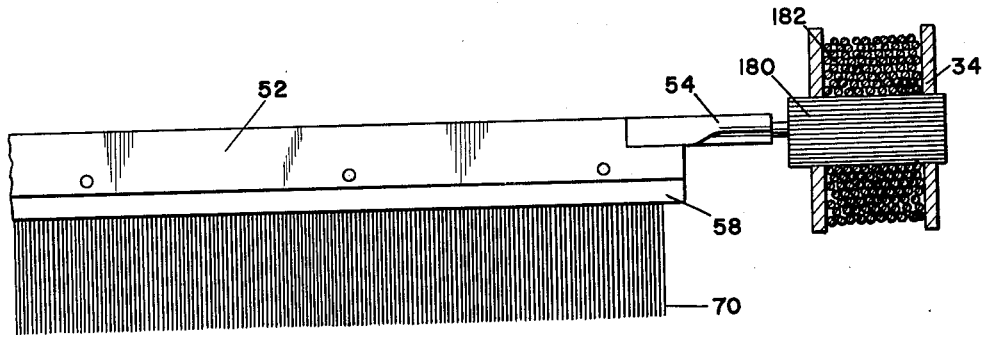
FIG. 16 is a side elevation partially in section of a modified form of invention wherein a coil is used to induce transverse reciprocation of the individual combs.
Figure 17:
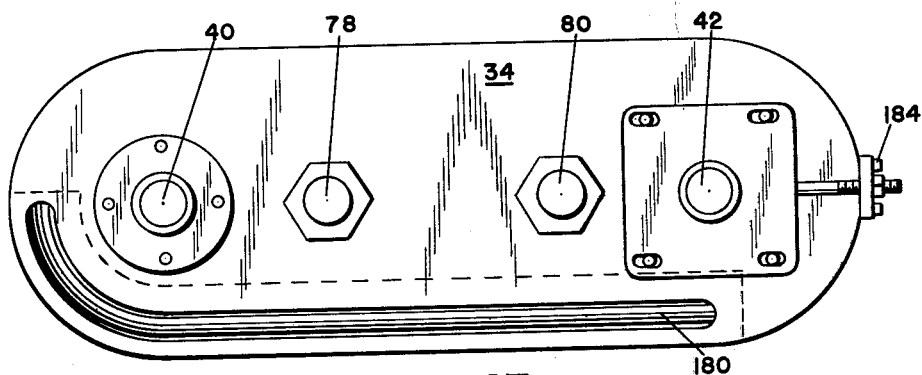
FIG. 17 is a side elvation of the coil and inductor bar positioned in the brush side plate.

In the modification shown in FIGS. 16 and 17 an inductor bar 180 is shown positioned in side piece 34 intermediate coil 182. As the individual battens 54 are contiguous with inductor bar 180 the entire brush assembly is continuously vibrated by the alternating current induced by the coil 182.

Figure 18:
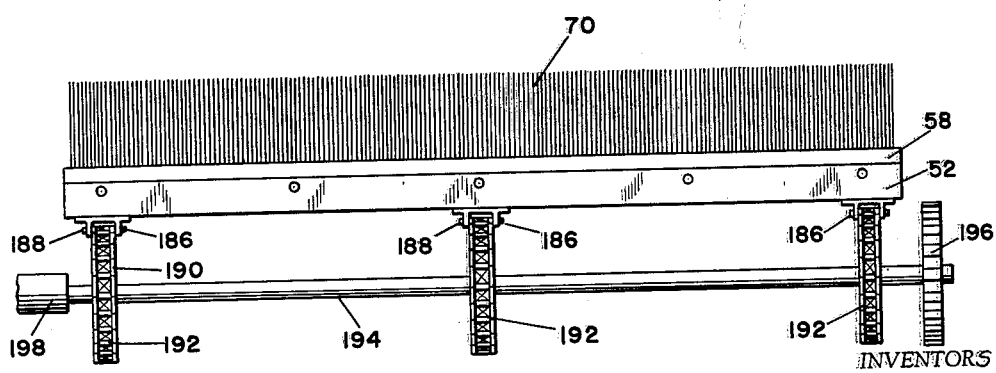
FIG. 18 is yet another modification of invention showing mounting of the individual combs upon endless chains instead of a belt.

In the modification illustrated in FIG. 18 the channels 52 instead of being supported upon an endless belt are secured to three separate chains 190 by means of attaching pieces 186 and pin 188. Chains 190 are rotatable about sprockets 192 attached to shaft 194 supported in bearing hub 198 and driven by gear 196. In this modification the endless belt is eliminated entirely and a simplicity in cleaning is obtained.

Figure 19:
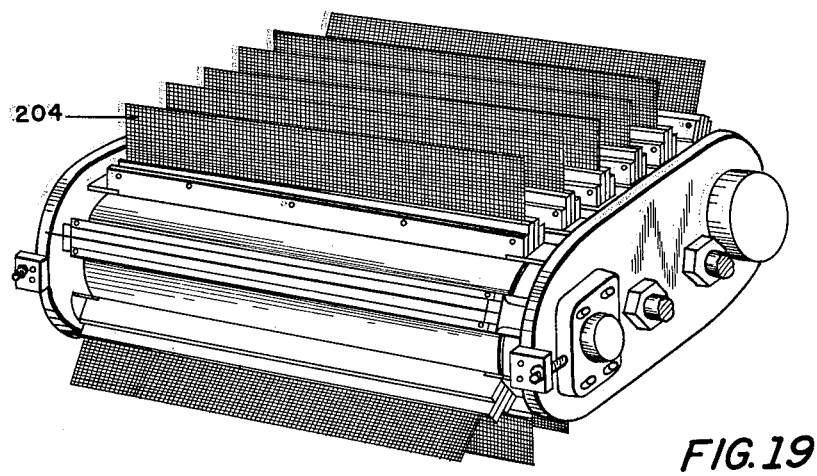
FIG. 19 is a perspective of a modified apparatus wherein a plurality of strips of screens, in lieu of transversely aligned combs, are attached to an endless belt.

In the FIG. 19 assembly modification individual strips of screens 204 are employed in lieu of the teeth 70. Securement is by similar means as illustrated in FIGS. 4 through 6. This arrangement provides for a four dimensional sizing of materials.

Figure 20:
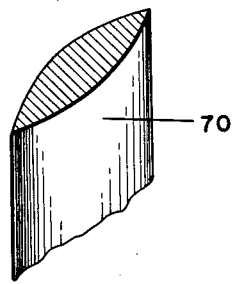
FIG. 20 is a fragmentary perspective of modified comb teeth having a tapered cross section.
Figure 21:
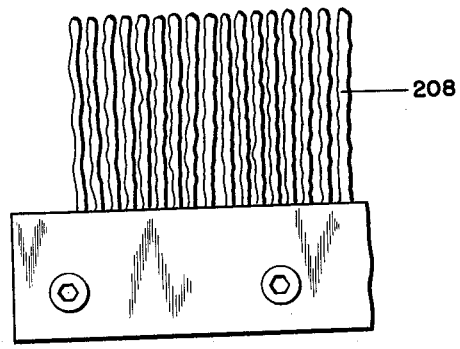
FIG. 21 is a side elevation of modified comb teeth having a wavy profile.
Figure 22:
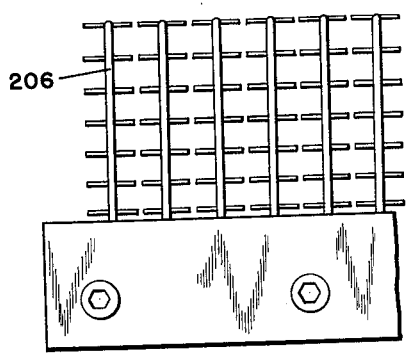
FIG. 22 is a side elevation of modified teeth having laterally extending spurs.

Various configurations of teeth 70 are presented in FIGS. 20 through 22. In the FIG. 20 construction the tooth 70 has a tapered cross section. In the FIG. 21 construction teeth 208 have a wavy profile and in the FIG. 22 construction teeth 70 have individual spurs 206 which provide the effects of the FIG. 19 screens' construction while allowing for inexpensive replacement of the individual teeth.

Manifestly, various modifications in construction may be employed without departing from the spirit and scope of invention, as defined in the subjoined claims.

We claim:

1. A method for sizing matter comprising:
   (a) horizontally advancing matter to be sized upon a conveyor;
   (b) positioning a plurality of revolving radially extending combs having individually spaced teeth above and adjacent to said conveyor so that at all times a plurality of comb teeth tips are closer to said conveyor than said teeth are to each other;
   (c) repetitively, longitudinally combing said matter throughout a sustained portion of said advancing with said combs, so that at all times a plurality of said radially extending combs are perpendicularly presented with respect to said conveyor;
   (d) transversely reciprocating said combs to vibrate said combs at a high frequency during said combing so as to enhance combing action and clearing of said combs;
   (e) removing greater sized matter incapable of being advanced beyond said combing; and
   (f) sequentially of said combing, removing smaller sized matter advancing through said combing.

2. Method as in claim 1 including combing said matter alternately obliquely with a plurality of sets of increasingly finely sized combs.

3. Method as in claim 1, including varying the rates of advancing and combing said matter so as to control the rate of sizing.

4. Apparatus for sizing of matter comprising:
   (A) An endless conveyor;
   (B) Means feeding matter to be sized upon said conveyor;
   (C) A plurality of transversely aligned radially extending combs having individually spaced teeth and mounted upon a rotatable belt of oblong cross-section extending across said conveyor with its top and bottom portions parallel to said conveyor said combs having teeth ends closer to said conveyor than said teeth are to each other; and
   (D) Transverse reciprocating means attached to said belt to vibrate said combs.

5. Apparatus as in claim 4 including a plurality of endless combing belts with transversely aligned, radially extending combs alternately obliquely positioned with respect to said conveyor, respective said combing belts having combs of increasing fineness.

6. Apparatus as in claim 4, wherein said combs have individual teeth with a tapered cross section.

7. Apparatus as in claim 4, wherein said combs have individual teeth with a wavy profile.

8. Apparatus as in claim 4, wherein said combs have individual teeth with laterally extending spurs.

References Cited in the file of this patent

UNITED STATES PATENTS

| | | |
|---|---|---|
| 554,912 | Derrenberger | Feb. 18, 1896 |
| 790,171 | Bechtel | May 16, 1905 |
| 866,704 | Witt | Sept. 24, 1907 |
| 1,186,375 | Burrows | June 6, 1916 |
| 2,491,401 | Tucker | Dec. 13, 1949 |
| 2,517,733 | Takats | Aug. 8, 1950 |
| 2,714,953 | Wolski | Aug. 9, 1955 |
| 2,801,598 | Dunns | Aug. 6, 1957 |
| 2,942,607 | Skinner | June 28, 1960 |

FOREIGN PATENTS

| | | |
|---|---|---|
| 21,977 | Great Britain | Sept. 30, 1913 |
| 98,286 | Sweden | Mar. 12, 1940 |
| 646,318 | Great Britain | Nov. 22, 1950 |
| 774,461 | Great Britain | May 8, 1957 |
| 90,098 | Sweden | Aug. 31, 1937 |